W. F. DREW.
WEIGHING SCALE.
APPLICATION FILED MAY 29, 1906.
1,003,439.
Patented Sept. 19, 1911.
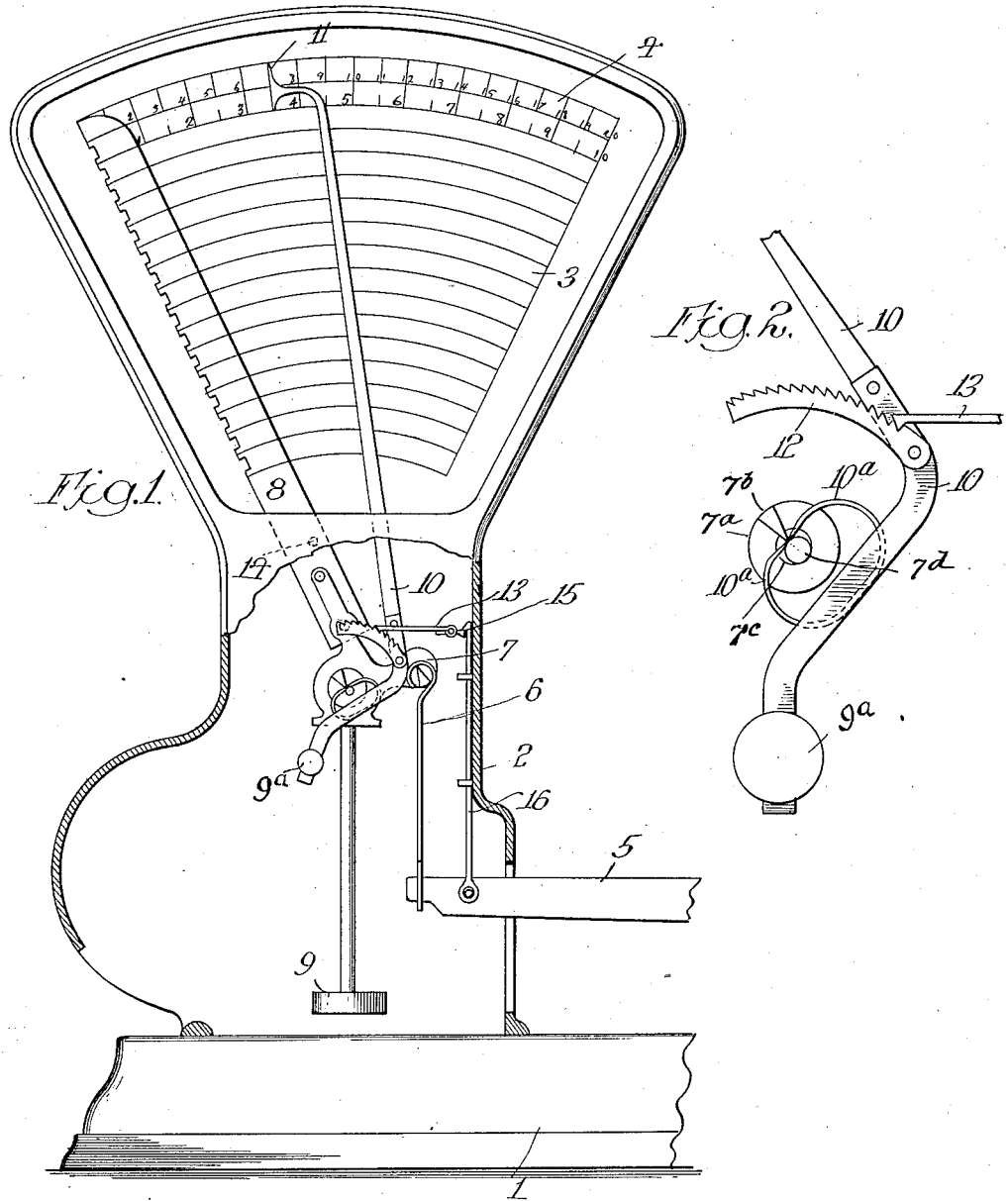

UNITED STATES PATENT OFFICE.

WILLIAM F. DREW, OF SAN FRANCISCO, CALIFORNIA, ASSIGNOR TO TOLEDO COMPUTING SCALE COMPANY, OF TOLEDO, OHIO, A CORPORATION OF NEW JERSEY.

WEIGHING-SCALE.

1,003,439.        Specification of Letters Patent.        Patented Sept. 19, 1911.

Application filed May 29, 1906. Serial No. 319,344.

*To all whom it may concern:*

Be it known that I, WILLIAM F. DREW, a citizen of the United States, residing at San Francisco, in the county of San Francisco and State of California, have invented certain new and useful Improvements in Weighing-Scales, of which the following is a specification.

The object of the present invention is to provide means in weighing scales for preserving the weight indication between transactions so that the customer may have ample opportunity to read the weight. Ordinarily the goods being weighed are so quickly removed from the scales that the weight indication is but momentary and while the tradesman has no difficulty in reading the same at a glance, the customer, less familiar with the scales, is not so adept at reading the same. The present invention provides for retaining the indicator at the indicating position to which it is brought by the weight of the goods and then automatically releasing it when the scales are again used so that it can take up a new position in accordance with the weight of the goods then being weighed.

With the above stated and incidental objects in view the invention consists in certain novel features of construction and combinations of parts, the essential elements whereof are recited in the appended claims and a preferred form or embodiment of which is described in detail hereinafter and fully illustrated in the accompanying drawings forming a part of this specification.

Of said drawings Figure 1 represents in front elevation a portion of a well known type of computing weighing scales having the present invention embodied therein, the housing of the scales being broken away to disclose interior parts; Fig. 2 represents on a larger scale in front elevation parts which go to make up the present improvement; and Fig. 3 represents certain of the parts in side elevation on an enlarged scale.

The type of scales in connection with which the invention is shown in the present instance is of the pendulum variety, such for example as shown in De Vilbiss re-issued Patent No. 12,029, dated September 9, 1902, and this patent may be consulted so far as the details of construction and mode of operation of this type of scales may be concerned. It will suffice for the purposes of the present specification to briefly enumerate some of the parts ordinarily constituting such a scale. It is not necessary that the scale pan and immediately associated parts be shown and in the view represented by Fig. 1 that portion of the scales is omitted.

The reference numeral 1 designates the supporting base from which rises a housing 2 containing in its upper part a computing chart 3 having at the top weight gradations 4 of the usual character.

The numeral 5 designates the scale beam which is connected through a link 6 with a fulcrum-piece 7 supporting the usual index-hand 8 which swings over the chart 3. The pendulum 9 is also secured to said fulcrum-piece and swings in the lower part of the housing 2. The fulcrum piece 7 is transversely bored to receive a short cylindrical section $7^a$ of hard metal such as steel from which are formed the knife edges $7^b$ which coöperate with the ordinary bearings not shown. Section $7^a$ is in turn provided with a central bore in which is received a cylindrical section $7^c$ of smaller diameter which latter section is provided with an eccentric lug $7^d$ which presents the form of a small cylinder projecting but slightly from the end of the section $7^c$. The center of this lug is on the diameter which bisects the knife edge $7^a$.

For the purposes of the present invention a supplemental index-arm 10 is fulcrumed concentrically with the pendulum and the index-hand 8, preferably by means of a hanger comprising curved members $10^a$ meeting in knife-edges over the lug $7^d$ on opposite sides of the knife edge $7^b$. Obviously the knife edge $7^b$ on the same side of the fulcrum piece as the lug $7^d$ extends beyond the latter to engage its support. This arm which also extends over the chart 3 is provided with a lateral extension 11 at its upper end providing an edge to travel along the weight scale 4. Below the fulcrum this index-arm constitutes a supplemental pendulum being provided with a weight $9^a$ which tends to hold the arm in line with the index-hand 8 and the reading edge 11 flush with the reading edge of the said hand. The supplemental arm carries a curved ratchet 12 engaged by a gravity pawl 13 pivoted in the housing. The index-hand 8 has a pin 14 to act against one side edge of the arm 10 and it will be seen that as said index-hand swings over the chart it will carry the said arm with it, the ratchet 12 clocking past the pawl 13. It will also be seen that when the weight is removed from the scales and the index-hand 8 returns to normal position the arm 10 will be restrained from so doing by reason of the engagement of the pawl 13 with a tooth of the ratchet 12. Thus the arm 10 remains at indicating position to show to the customer the weight of the commodity. The ratchet teeth 12 must of course be made to correspond with the gradations of the weight scale 4 so that wherever the said arm is carried by the weight of the commodity it will be caught and held over a division mark of said scale.

In order to release the arm 10 when a new transaction is to be made, the following devices are employed. Pivoted concentrically with the pawl 13 is a rocking plate 15 which engages under said pawl on one side of its pivot and preponderates in weight on the opposite side. A vertically sliding catch rod 16 is arranged on the inner wall of the housing 2 and loosely coupled at its lower end to the scale beam 5. The catch at its upper end engages over the projecting portion of the plate 15 as shown in Fig. 1. When the scale beam 5 is lowered by the weight in the scale pan, this catch rod 16 is drawn down and thereby tilts the plate 15, raising the pawl 13 from engagement with the ratchet 12. The arm 10 then swings toward normal position but the catch at the upper end of the rod 16 escapes past the edge of the plate 15 so that the pawl can reengage the ratchet as the indicating arm is moved to its new position. In the return of the scale beam said catch displaces the plate which then drops under it.

While the supplemental index-arm is here shown as extending over the front side of the chart it is obvious that it may extend behind the same so as to indicate on the duplicated weight scale in rear of the chart.

It will be seen that the above described construction is well calculated to fulfil the objects primarily stated but it is of course to be understood that the invention is capable of being embodied in other forms and so the following claims are not limited to the details of the construction here shown but recite merely essential elements of the invention.

What is claimed is:

1. In weighing scales, a weight indicator, means for holding it at indicating position between transactions, and means for automatically releasing it by weighing movement of the scale parts at the outset of a transaction.

2. In weighing scales, an indicating arm, means for holding it at indicating position between transactions, and means for automatically releasing said arm from indicating position by weighing movement of the scale parts at the outset of a transaction.

3. In weighing scales, a weight indicator, a detent for holding it at indicating position between transactions, and means for automatically displacing the detent by weighing movement of the scale parts at the outset of a transaction.

4. In weighing scales, an indicating arm, a detent for holding it at indicating position between transactions, and means for automatically displacing the detent by weighing movement of the scale parts at the outset of a transaction.

5. In weighing scales, a weight indicator having a ratchet, a detent engaging said ratchet to hold the indicator at indicating position between transactions, and means for automatically displacing said detent by weighing movement of the scale parts at the outset of a transaction.

6. In weighing scales, an indicating arm having a ratchet, a detent engaging said ratchet to hold the arm at indicating position between transactions, and means for automatically displacing said detent by weighing movement of the scale parts at the outset of a transaction.

7. In weighing scales, the combination of a scale beam, an indicator operatively connected therewith, a detent for holding said indicator at indicating position between transactions, and means for displacing said detent by the scale beam.

8. In weighing scales, the combination of a scale beam, an indicating arm operatively connected therewith, a detent for holding said indicating arm at indicating position between transactions, and means for displacing said detent by the scale beam.

9. In weighing scales, the combination of a scale beam, a weight indicator operatively connected therewith and having a ratchet, a pawl engaging said ratchet, a tilting plate engaging said pawl, and a catch rod engaging said plate and connected to the scale beam.

10. In weighing scales, the combination of a scale beam, an indicating arm having a ratchet, a pawl engaging said ratchet, a tilting plate engaging said pawl, and a catch rod engaging said plate and connected to the scale beam.

11. In pendulum scales, an indicating arm having a one-way connection with the pendulum, means for holding said arm at indicating position between transactions, and means for automatically releasing said arm from indicating position by weighing movement of the scale part at the outset of a transaction.

12. In pendulum scales, the combination with the pendulum; of an indicating arm pivoted concentrically with and engaged to be swung in one direction by, the pendulum; and means for holding said arm at indicating position between transactions, said arm being weighted to cause it to return to normal.

13. In pendulum scales, the combination with the scale beam and pendulum, of an indicating arm fulcrumed concentrically with the pendulum and adapted to swing therewith and having a ratchet, a pawl for engaging said ratchet to hold the arm at indicating position between transactions, and connection with the scale beam for displacing the detent at the outset of a transaction.

14. In pendulum scales, the combination with the scale beam, the pendulum, and the index-hand compounded with the latter, of a supplemental index-arm fulcrumed concentrically with the said index-hand and pendulum and having a one-way connection therewith, and means for holding said arm at indicating position between transactions.

15. In pendulum scales, the combination of the scale beam, the pendulum, the index-hand compounded therewith, a supplemental index-arm fulcrumed concentrically with the index-hand and having a reading edge to coincide with that of said hand, and means for holding said supplemental arm at indicating position between transactions.

16. In pendulum scales, the combination with scale beam and pendulum, of an indicating arm having a ratchet, a pawl engaging said ratchet, a tilting plate engaging said pawl and a catch rod engaging the plate and operated by the scale beam.

WM. F. DREW.

Witnesses:
ALBERT SCHMIDT,
FRANCES SCHMIDT.

Copies of this patent may be obtained for five cents each, by addressing the "Commissioner of Patents, Washington, D. C."